May 3, 1960

G. W. ASHLOCK, JR 2,935,104

STRIPPING MEANS FOR CHERRY PITTING HEAD

Filed July 31, 1956

INVENTOR

GEORGE W. ASHLOCK, JR., DECEASED

BY ALMA E. ASHLOCK, LEGAL REPRESENTATIVE

BY *Naylor & Neal*

ATTORNEYS

May 3, 1960 G. W. ASHLOCK, JR 2,935,104
STRIPPING MEANS FOR CHERRY PITTING HEAD
Filed July 31, 1956 2 Sheets-Sheet 2
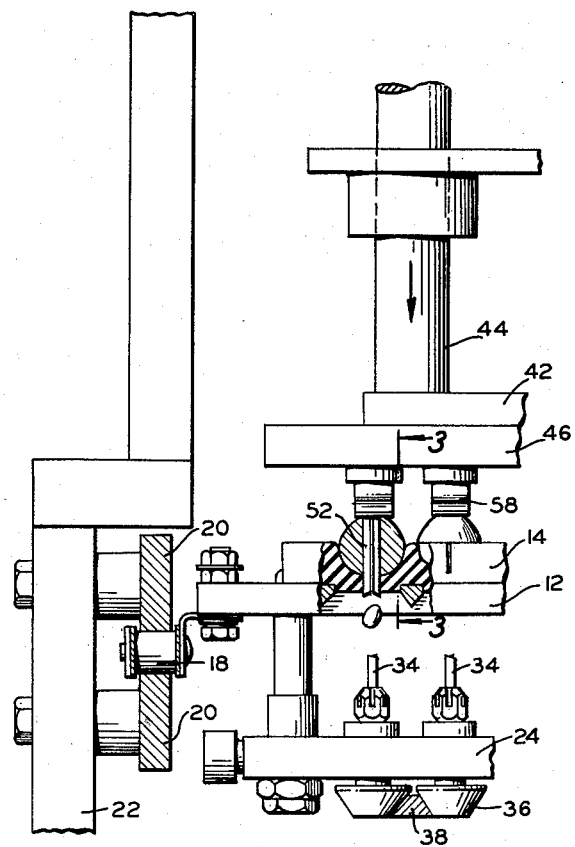
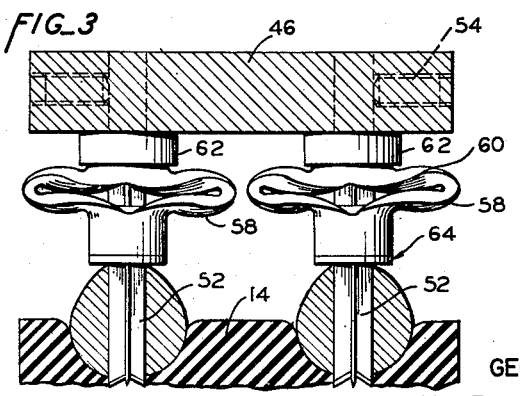
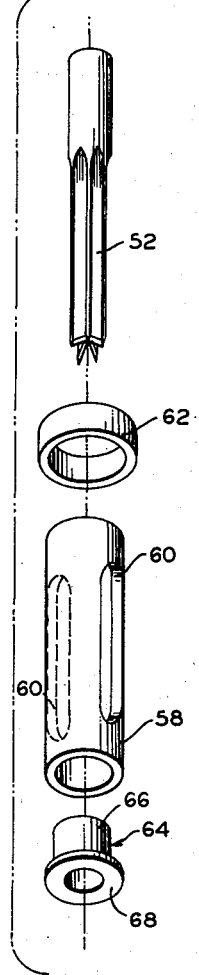
INVENTOR
GEORGE W. ASHLOCK, JR., DECEASED
BY ALMA E. ASHLOCK, LEGAL REPRESENTATIVE
BY Naylor & Neal
ATTORNEYS

United States Patent Office 2,935,104
Patented May 3, 1960

2,935,104
STRIPPING MEANS FOR CHERRY PITTING HEAD

George W. Ashlock, Jr., deceased, late of Oakland, Calif., by Alma E. Ashlock, legal representative, Oakland, Calif., assignor to George W. Ashlock Co., Oakland, Calif., a corporation of California Application July 31, 1956, Serial No. 601,315

5 Claims. (Cl. 146—19)

This invention relates to a fruit pitting machine which is particularly adapted for the pitting of cherries, and more particularly to improved stripping means in association with the pitting knives adapted upon downward movement of the pitting mechanism toward the conveyor carrying oriented cherries to engage and hold the cherries so that their positions will not be disturbed by the entry of the knife blades and to strip the cherries from the knife blades when the blades are withdrawn from the fruit and moved upwardly relative to the stripping means.

The cherry stripping means of the invention constitutes an improvement over the cherry stripping means of Figure 3 of the applicant's prior Patent No. 2,567,591, issued September 11, 1951.

Among the objects of the present invention are: the provision of greatly simplified cherry stripping means which is considerably reduced in bulk and weight in comparison with the stripping means shown in the applicant's aforementioned patent and which is therefore considerably less expensive to produce and assemble and which has a considerably lesser tendency, due to a decreased inertia effect, to bruise the fruit upon contacting the same; and the provision of cherry stripping means adapted to be yieldingly moved by the cherries in relation to the knife blades without any substantial increase in the resistance to movement of said means in relation to the distance of movement of said means.

These and other objects and advantages of the invention will be apparent from the following description taken in conjunction with the drawings forming part of this specification, and in which:

Figure 2 is a partial view similar to that of Figure 1 showing the machine elements in the act of pitting the cherries;

Figure 3 is an enlarged detail view taken along lines 3—3 of Figure 2 and showing the subject cherry stripping means in compressed condition; and Figure 4 is a showing in perspective of a knife blade and stripping means therefor in separated relation.

Figure 1:
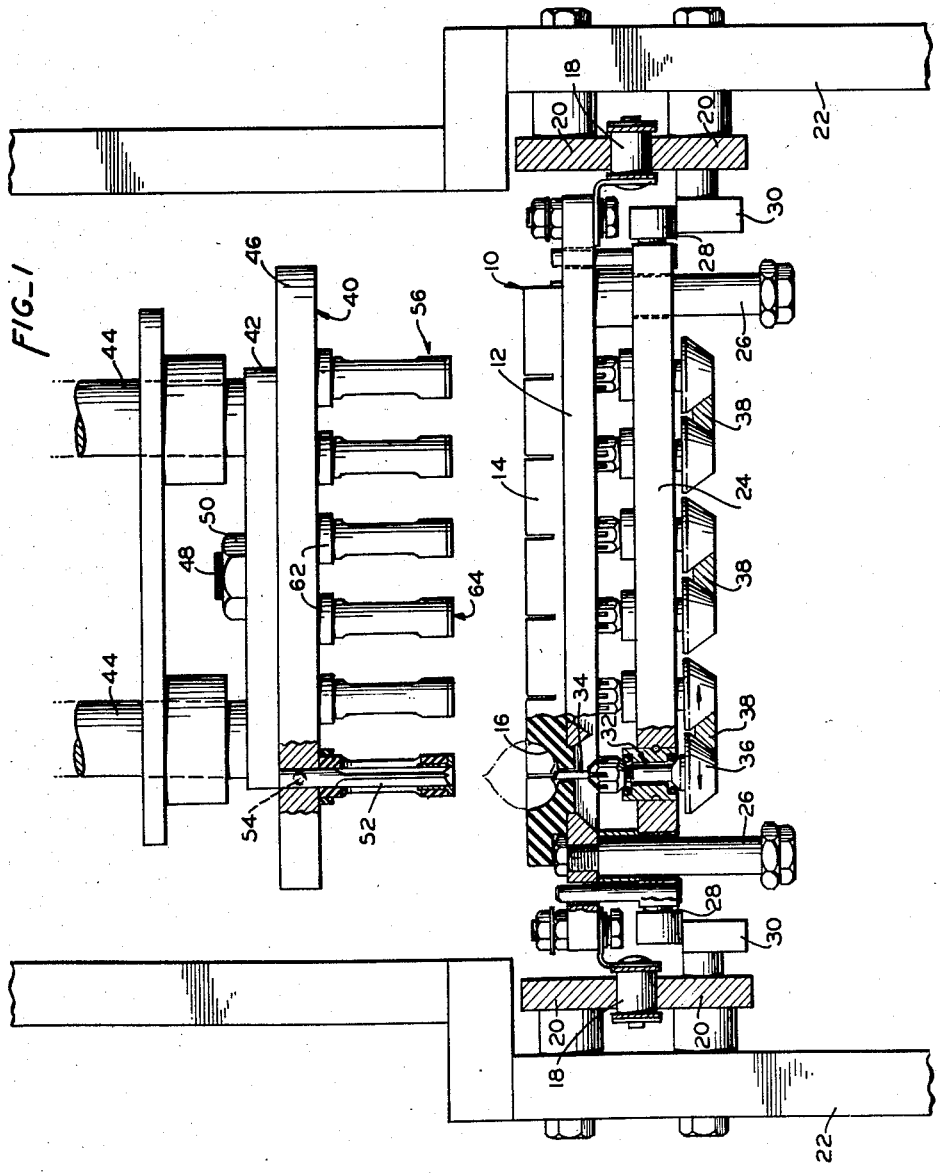
Figure 1 is a view in transverse section of a cherry pitting machine embodying the invention.

With reference to Figure 1, the cherry conveyor and orientator assembly indicated generally at 10 is generally of the type disclosed in the applicant's prior Patent 2,406,311, issued August 27, 1946, and it essentially corresponds to the conveyor and orientator arrangement illustrated in Figure 3 of the applicant's prior Patent 2,528,294, issued August 31, 1950. In brief, the conveyor portion of this assembly comprises a plurality of base plates 12 having secured thereto rubber plates 14 provided with conoidal cherry-receiving cavities 16, with said plates 12 being carried by chains 18 trained between upper and lower stabilizer guides secured to the main side plates 22. The orientator portion of this assembly comprises plates 24 slidably disposed on hanger rods 26 carried by plates 12, rollers 28 carried by plates 24 and adapted to travel on rails 30, members 32 rotatably carried by plates 24 having upper toothed rod portions 34 adapted to extend through apertures in rubber plate 14 into communication with the fruit pockets 16, and having lower wheel portions 36 adapted to be rotated by belts 38.

Cherries are fed haphazardly into the conveyor pockets 16. The plates 24 are then moved upwardly toward plates 14 when the rollers 28 encounter an upward incline of rails 30, and such upward movement introduces the toothed rod portions 34 of members 32 into the fruit pockets 16. Rotation of wheel portions 36 of members 32 through contact of the same with belts 38 causes the rod portions 34 to rotate and thereby effect orientation of the cherries so that they are thereby disposed with their stem indents downwardly. Plates 24 are then moved downwardly by travel of rollers 28 on a downwardly inclined section of rails 30 to dispose the orientator away from the conveyor and enable the pitting operation to proceed.

The pitting head assembly is indicated generally at 40. This pitting head assembly, which is mounted for operation in the manner disclosed in the applicant's prior Patent 2,567,591 and earlier patents referred to in said patent, comprises a plate 42 carried by plungers 44, a plate 46 having a stud 48 extending through plate 42 and being secured to plate 42 by nut 50, a plurality of star-shaped knife blades 52 having their shank portions secured in plate 46, as by set screws 54, and stripper means indicated generally at 56 attached to said knife blades. The plungers 44 extend into recesses formed in plate 40 to position and to retain plate 40 in location.

The stripper means 56 comprises a rubber sleeve 58 disposed around each knife blade 52 and having a pair of oppositely disposed elongated slots 60 formed therein, a rubber band 62 fitted about the upper end of sleeve 58 and serving to clamp the upper end of the sleeve to the shank of the knife blade, and a metal ferrule 64 having a cylindrical portion 66 frictionally fitted within the lower end of sleeve 58 and having a flange portion 68 adapted to abut the lower end of sleeve 58.

Downward movement of the pitting head assembly 40 brings the ferrule 64 into holding engagement with the oriented cherries. Further downward movement of the assembly forces the knife blades 52 through the cherries to expel the pits through the openings formed in rubber plate 14 at the bottom of conveyor pockets 16. As the knife blades move into the cherries in the pitting operation, the rubber sleeves 58 are longitudinally compressed between plate 46 and the cherries, and the slots 60 formed in the sleeves 58 permit the sleeves to collapse in the manner shown in Figure 3. When the pitting head assembly is subsequently raised, the sleeves 58 longitudinally expand to their normal unstressed condition, meanwhile functioning to strip the cherries from the knife blades and maintain the pitted cherries in the conveyor pockets.

Due to the presence of the slots 60 in sleeves 58, which enable the sleeves to expand radially while being longitudinally compressed, there is no build-up of the pressure applied by the sleeves 58 to the cherries during the course of compression of the sleeves, as there would be if the sleeves 58 acted as true springs in compliance with Hooke's law. This is a desirable advantage, as the danger of bruising the fruit during the course of the pitting operation is minimized.

The subject stripping means makes for overall simplification of the pitting head assembly. This may be best appreciated by comparing the pitting head assembly 40 of Figure 1 with the pitting head assembly shown in Figure 3 of the applicant's prior Patent 2,567,591. It will be seen that the subject stripping means enables the elimination of a considerable number of parts, a considerable reduction in weight of the head assembly, and consequent economy and ease of assembly. Furthermore, the subject stripping means is more efficient in operation than the stripping means shown in Patent 2,567,591.

What is claimed is:

1. In a fruit pitting machine having a fruit carrier movable continuously past a pitting station and a pitting knife supported for movement downward and toward and upward and away from said carrier, improved stripping means for said knife comprising a resilient sleeve disposed over said knife and having the upper end thereof in secured relation to said knife and having the lower end thereof normally disposed below the lower end of said knife, said sleeve having elongated longitudinally extending relief openings formed therein adapted to facilitate end-wise compression of said sleeve when said knife moves relative to said sleeve and enters the fruit to be pitted.

2. In a fruit pitting machine having a fruit carrier movable continuously past a pitting station and a straight pitting knife supported for movement downward and toward and upward and away from said carrier, improved stripping means for said knife comprising a length of rubber tubing sleeved over said knife in full covering relation therewith, an elastic band in embracing relation with the upper end of said tubing and clamping said upper end to said knife, said tubing being otherwise free for longitudinal compression with respect to said knife, a ferrule formed of rigid material having a cylindrical portion frictionally fitted within the lower end of said tubing and a radial flange portion abutting the lower edge of said tubing, said tubing having a plurality of elongated longitudinally extending slots formed therein defining therebetween radial extending tubing portions when said tubing is longitudinally compressed.

3. Fruit stripping means for a pitting knife of the type adapted to be forced outwardly and through a fruit to expel the pit thereof comprising a rubber sleeve consisting of an annular wall enclosing said knife, a plurality of elongated longitudinally extending slots formed in said sleeve and extending fully through said wall in a radial direction, said slots terminating short of the inner and outer end portions of said sleeve, means securing the inner end portion of said sleeve to said knife, and a rigid annular insert having a cylindrical portion fitted within the outer end portion of said sleeve and extending substantially to the outer ends of said slots and a radial flange portion disposed in abutting relation with the end of said sleeve.

4. Fruit stripping means for a pitting knife of the type adapted to be forced outwardly and through a fruit to expel the pit thereof comprising a rubber sleeve freely fitted over said knife and having its inner end fixedly positioned with respect to said knife, the outer end of said sleeve being adapted to engage the fruit to be pitted before said knife engages said fruit, said sleeve being provided with slot-like relief openings extending longitudinally of said sleeve and adapted to facilitate end-wise compression of said sleeve when said knife moves relative to said sleeve and enters the fruit to be pitted.

5. Fruit stripping means as set forth in claim 4, said sleeve having attached to its lower end a rigid annular member adapted to engage the fruit to be pitted and to prevent said sleeve from wiping against said knife during longitudinal compression and expansion of said sleeve.

References Cited in the file of this patent

UNITED STATES PATENTS

| | | |
|---|---|---|
| 2,230,043 | Moran | Jan. 28, 1941 |
| 2,567,591 | Ashlock | Sept. 11, 1951 |
| 2,727,738 | Lindley | Dec. 20, 1955 |